United States Patent
Stanfield et al.

(10) Patent No.: US 10,081,298 B2
(45) Date of Patent: Sep. 25, 2018

(54) APPARATUS AND METHODS FOR RENTING AND CONTROLLING OCCUPANCY OF A VEHICLE

(71) Applicant: ZIPCAR, INC., Boston, MA (US)

(72) Inventors: John Stanfield, Mountain View, CA (US); Clement Gires, Palo Alto, CA (US)

(*) Notice: Subject to any disclaimer, the term of this patent is extended or adjusted under 35 U.S.C. 154(b) by 0 days.

(21) Appl. No.: 15/262,290

(22) Filed: Sep. 12, 2016

(65) Prior Publication Data

US 2017/0008451 A1 Jan. 12, 2017

Related U.S. Application Data

(63) Continuation of application No. 13/788,836, filed on Mar. 7, 2013, now Pat. No. 9,442,888.

(60) Provisional application No. 61/607,989, filed on Mar. 7, 2012.

(51) Int. Cl.

| | |
|---|---|
| B60Q 1/50 | (2006.01) |
| G06F 17/00 | (2006.01) |
| G08G 1/00 | (2006.01) |
| G08G 1/095 | (2006.01) |
| B60N 2/00 | (2006.01) |
| B60Q 1/26 | (2006.01) |
| E05B 81/56 | (2014.01) |
| F02N 11/08 | (2006.01) |

(52) U.S. Cl.
CPC ............... *B60Q 1/50* (2013.01); *B60N 2/002* (2013.01); *B60Q 1/268* (2013.01); *B60Q 1/2665* (2013.01); *B60Q 1/2696* (2013.01); *E05B 81/56* (2013.01); *F02N 11/0807* (2013.01); *G06F 17/00* (2013.01); *G08G 1/095* (2013.01); *G08G 1/20* (2013.01)

(58) Field of Classification Search
CPC .......... G08G 1/20; G08G 1/095; G06F 17/00; B60N 2/002; B60Q 1/268; B60Q 1/2696; B60Q 1/50
See application file for complete search history.

(56) References Cited

U.S. PATENT DOCUMENTS

| 9,442,888 B2 * | 9/2016 | Stanfield | ............... G08G 1/20 |
| 2005/0012589 A1 * | 1/2005 | Kokubu | ............... B60R 25/24 340/5.1 |
| 2011/0112969 A1 * | 5/2011 | Zaid | ............... G06Q 10/02 705/50 |

* cited by examiner

*Primary Examiner* — Kim T Nguyen
(74) *Attorney, Agent, or Firm* — Wayne Edward Ramage; Baker Donelson

(57) ABSTRACT

One variation of a method for renting a vehicle includes: receiving a signal from a fleet manager, the signal specifying a current availability of the vehicle for rent; updating a visual indicator arranged on the vehicle according to the signal, the visual indicator visually detectable from outside the vehicle; receiving identification information of a user proximal the vehicle; enabling access to the vehicle for the user in response to verification of the user as a driver of the vehicle; determining, through a sensor arranged within the vehicle, that the user is seated in a driver's seat within the vehicle; and enabling ignition of the vehicle for the user in response to determination that the user is seated in the driver's seat.

15 Claims, 8 Drawing Sheets

APPARATUS AND METHODS FOR RENTING AND CONTROLLING OCCUPANCY OF A VEHICLE

This application is a continuation of U.S. patent application Ser. No. 13/788,836, filed Mar. 7, 2013, which claims benefit of and priority to U.S. Provisional Application No. 61/607,989, filed Mar. 7, 2012, and is entitled to those filing dates for priority. The specification, figures, appendices and complete disclosure of U.S. Provisional Application No. 61/607,989 and U.S. patent application Ser. No. 13/788,836 are incorporated herein in their entireties by specific reference for all purposes.

FIELD OF INVENTION

This invention relates generally to the rental vehicle field, and more specifically to a new and useful apparatus and methods for renting and controlling occupancy of a rental vehicle in the rental vehicle field.

BACKGROUND OF THE INVENTION

Ridesharing is often used to reduce travel cost, reduce the capital costs of traveling (e.g., vehicles, insurance, maintenance), and/or reduce environmental impact. Local and state governments also offer incentives for people to carpool or share rides, such as carpool lanes on highways. A fundamental principal of public transportation is to share travel expenses, from fuel to capital costs, by mobilizing large volumes of people at once. However, ridesharing and carpooling in personal and private vehicles often requires substantial planning and leaves little opportunity for personalized routes or flexible scheduling. Individuals therefore occasionally turn to rental vehicle to fulfill mobility needs, but current rental vehicles typically assume the role of private vehicles while in use and therefore do not provide increased mobility to other users.

Thus, there is a need in the rental vehicle field for new and useful apparatus and methods renting and controlling occupancy in a rental vehicle. This invention provides such a new and useful apparatus and methods.

DETAILED DESCRIPTION OF EXEMPLARY EMBODIMENTS

The following description of exemplary embodiments of the invention is not intended to limit the invention to these embodiments, but rather to enable any person skilled in the art to make and use this invention.

1. Method for Renting a Vehicle

Figure 1:
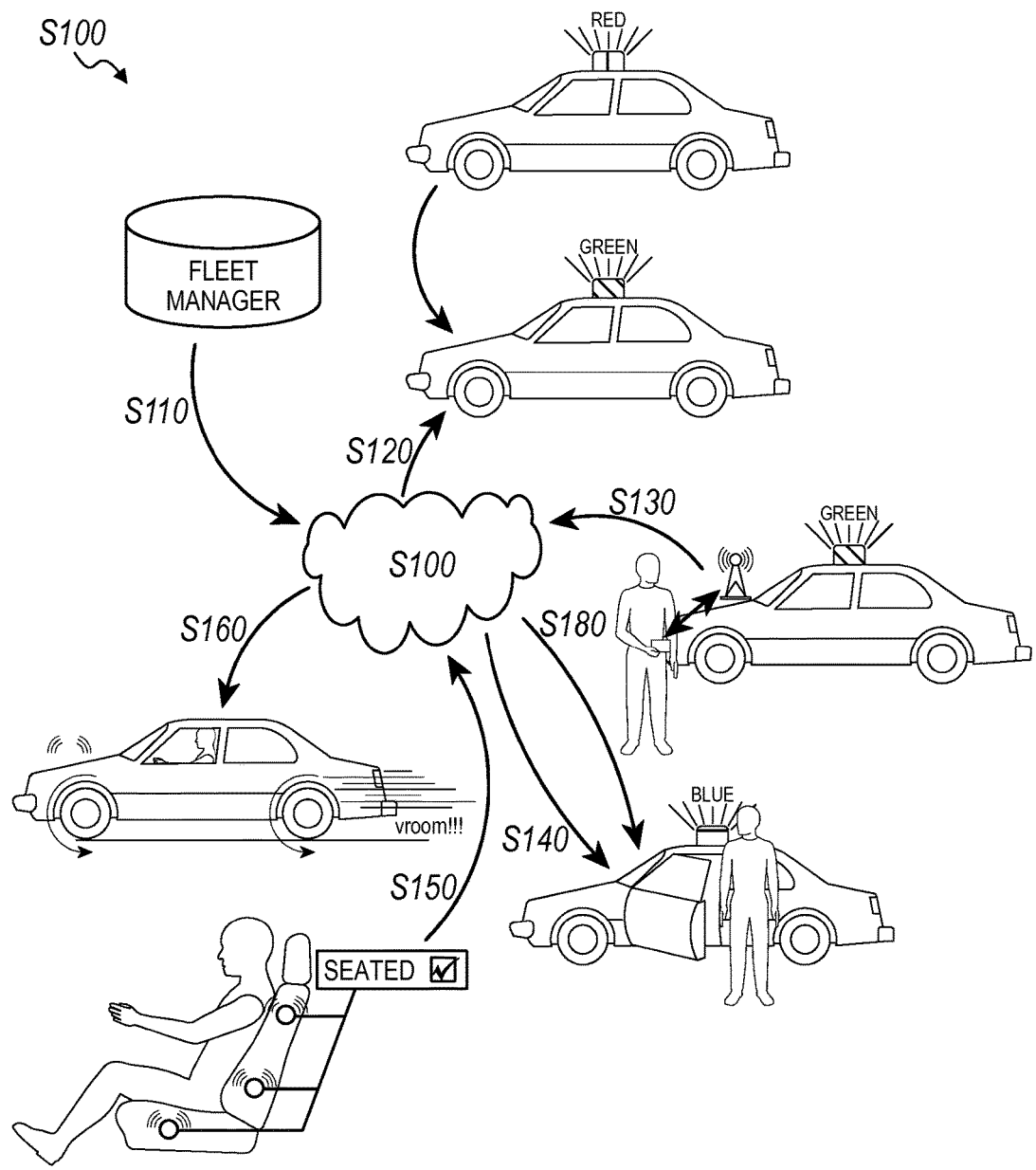
FIG. 1 is a flowchart representation of a method of a first embodiment of the invention.

As shown in FIG. 1, method S100 for renting a vehicle includes: receiving a signal from a fleet manager in Block S110, the signal specifying a current availability of the vehicle for rent; updating a visual indicator arranged on the vehicle according to the signal in Block S120, the visual indicator visually detectable from outside the vehicle; receiving identification information of a user proximal the vehicle in Block S130, enabling access to the vehicle for the user in response to verification of the user as a driver of the vehicle in Block S140, determining, through a sensor arranged within the vehicle, that the user is seated in a driver's seat within the vehicle in Block S150, and enabling ignition of the vehicle for the user in response to determination that the user is seated in the driver's seat in Block S160.

Method S100 functions to display an availability status of a rental vehicle such that a user outside the vehicle can visually discern the vehicle's availability, to capture an identity of the user and assign the user as a driver of the vehicle and to ensure that the user is occupying a proper seat within the vehicle prior to enabling full access (e.g., ignition) to the vehicle for the user. Generally, method S100 can be applicable to a vehicle in a fleet of rental vehicles, in a fleet of shared private vehicles, that a single shared private vehicle, etc. to enable substantially real-time or "impulse" booking of the vehicle by a user. By visually displaying an availability status of the vehicle, method S100 can enable a user who is outside of the vehicle, such as walking through a parking lot or in an adjacent building, to substantially immediately ascertain the availability of the vehicle, and by collecting identification information of the user, method S100 can determine substantially in real-time if the user is a suitable driver and/or how to bill the user for the rental. Furthermore, by determining the user's seating position and controlling access to the vehicle (e.g., door entry, ignition), method S100 can control who enters and who drives the vehicle.

Method S100 can be implemented by a vehicle rental apparatus, such as arranged on, arranged within, or incorporated into the vehicle. The rental apparatus can include a processor and input and output modules that interface with various vehicle systems, such as a door locking function, an ignition function within the vehicle, and a seat occupancy sensor. The rental apparatus can also implement an optical sensor (e.g., camera), a radio-frequency identification (RFID) reader, a barcode scanner, a magnetic stripe reader, a near-field communication (NFC) reader, or any other sensor or combination of sensors to capture an identify of the user. The rental apparatus can further include a wireless communication module that communicates with a remote computer system that implements a vehicle fleet manager to set availability of one or more vehicles in a fleet of rental vehicles, such as based on current or anticipated future demand. For example, the vehicle fleet manager can handle user- and vehicle-related data collected by and transmitted from the rental apparatus to identify a location of the vehicle and to verify the user as a suitable driver. The vehicle fleet manager can be implemented by a computer system that is a cloud-based computer system (e.g., Amazon EC2), a mainframe computer system, a grid-computer system, or any other suitable computer system. The rental apparatus can additionally or alternatively interface with a mobile computing device carried by and/or issued to the user (e.g., a smartphone, a tablet), such as via a Wi-Fi, Bluetooth, cellular, or other wireless connection. For example, the rental apparatus can interface with a native application executing on the mobile computing device to access user identification information, to confirm a vehicle booking, to unlock the vehicle, and/or to start the vehicle based on one or more user inputs into the mobile computing device and wirelessly communicated to the rental apparatus. All or a portion of method S100 can be implemented directly by a native application executing on a mobile computing device (e.g., a smartphone, a tablet), such as variations that implement Block S120 through an augmented reality overlay on a display of the mobile computing device, as described below. However, one or more Blocks of method S100 can be implemented by any one or more of a rental apparatus within the system, a remote computer system and/or vehicle fleet manager, a mobile computing device (e.g., carried by and/or issued to the user), a local kiosk proximal the vehicle, or any other suitable device, system, controller, etc.

Block S110 of method S100 recites receiving a signal from a fleet manager, the signal specifying a current availability of the vehicle for rent. Generally, Block S110 functions to access data pertaining to the availability of the vehicle for rent, and Block S110 can therefore enable Block S120 to update the visual indicator to accurately display a current availability of the vehicle for rent such that the vehicle is only advertised to persons outside the vehicle, via the visual indicator, when the vehicle is available. To set the vehicle as available to a driver, the signal can specify that the vehicle currently retains no driver booking and no, one, or more passenger bookings. The signal can additionally or alternatively specify a current or future period of availability or unavailability, a booking schedule including time periods during which the vehicle is booked (e.g., by the user or by another user), an identifier of a current or future driver or passenger (e.g., name, credit card number, picture, cellular number, email address), a preferred location of the vehicle, etc.

As described above method S100 can interface with a remote fleet manager, and Block S110 can therefore receive the signal specifying current vehicle availability from the fleet manager. For the vehicle that is part of a fleet of rental vehicles, the signal can also include a unique identifier of the vehicle such that the fleet manager can independently set the availability of multiple vehicles within the vehicle fleet. Alternatively, for the vehicle that is a single shared private vehicle, Block S110 can receive the signal from a private user, such as an owner of the vehicle via an online vehicle share service through which the private user can set availability of the vehicle. However, Block S110 can receive the signal from any other suitable entity.

In one implementation, as described above, method S100 is implemented by a rental apparatus arranged on or within the vehicle. In this implementation, Block S110 can interface substantially directly with the fleet manager or other vehicle controller, such as through a wireless communication module arranged within the vehicle and implementing cellular, Wi-Fi, satellite or other long-distance communication channel. Alternatively, Block S110 can communicate with the fleet manager or other controller substantially indirectly, such as by implementing short-distance communication channels (e.g., Bluetooth, Xbee) to communicate with a smartphone or other mobile computing device carried by the user capable of long-distance communication channels.

In an alternative implementation, Block S110 is implemented through a native application executing on a mobile computing device (e.g., a smartphone), wherein the native application receives the rental status of the vehicle and implements the received status in an augmented reality overlay as described below. For example, method S100 can implement machine vision techniques to identify the vehicle in an image captured by the user through the mobile computing device and, in response to positive identification, implement Block S110. Similarly, method S100 can poll a GPS sensor within the mobile computing device and, in response to a polled location that is substantially proximal the vehicle, implement Block S110. In this alternative, all or a portion of method S100 can be implemented on the mobile computing device. However, Block S110 can function in and/or be implemented in any other way to access a rental status of the vehicle.

Block S120 of method S100 recites updating a visual indicator arranged on the vehicle according to the signal, the visual indicator visually detectable from outside the vehicle. Generally, Block S120 functions to control the visual indicator to signify driver and/or passenger availability of the vehicle to a person outside the vehicle. Therefore, Block S120 can enable visual access to passenger and/or driver availability of the vehicle, thereby enabling a person with visual access to the vehicle (e.g., adjacent the vehicle, in an office building adjacent a parking lot in which the vehicle is parked) to substantially immediately comprehend the rental status of the vehicle. For example, Block S120 can set the color of a lamp arranged on a first vehicle to 'green,' indicating that the first vehicle is available, and Block S120 can further set the color of a lamp arranged on a second vehicle to 'blue,' indicating that the second vehicle is has been reserved by a user but still has available passenger seats. In this example, the user can access the second vehicle that he has previously reserved or the first vehicle that is not yet booked.

In one implementation, the visual indicator can include one or more light sources, such as one or more LEDs, incandescent light bulbs, backlit digital or heads-up displays, or projectors. For example, the visual indicator can be a light source arranged within the vehicle, such as on a rearview mirror assembly within the vehicle, in a discreet (e.g., standalone) rental apparatus coupled to an interior surface of a window, on a dashboard of the vehicle, or on or within any other component in the vehicle. Alternatively, the visual indicator can be a light source arranged outside the vehicle, such as on a license plate bezel, on a side mirror, around a circumference of or along a horizontal portion of a windshield, on a wheel, or on or in any other surface or component on the vehicle. Block S120 can update the visual indicator by changing an output of the light source from a first color specifying that the vehicle is in use to a second color indicting that the vehicle is available for rent. For example, the light source can include a multi-color LED, wherein the first color indicating unavailability of the vehicle (e.g., the vehicle is reserved) is a blue hue and wherein the second color indicating driver's seat availability of the vehicle is a green hue. Furthermore, the light source can be capable of outputting an orange hue to signify unavailability of the driver's seat but availability of a passenger seat, a white hue to signify that the vehicle is in use, and/or a red hue to signify that the vehicle is in disrepair. In this example, Block S120 can control the state (i.e. color) of the multi-color LED according to the availability of the signal, though Block S120 can implement similar functionality by controlling any number of LEDs or other light sources of different colors. Block S120 can also control the visual indicator according to a charge level or fuel level of the vehicle. For example, Block S120 can control a set of linear or circular bar elements around a central lamp, wherein the central lamp indicated vehicle availability, and wherein a number of lighted bar elements corresponds to battery level and/or vehicle range. Block S120 can additionally or alternatively control the visual indicator to display a time until a next or future booking. For example, Block S120 can control an e-ink component of the display to inform that user that the vehicle is available for a particular period of time but must be returned by a certain time or with a certain time period to accommodate the future booking. For the vehicle that has an upcoming reservation, Block S120 similarly control the display to indicate when and who has reserved the vehicle and for how long, for what purpose, and/or for what destination. For example, Block S120 can control the e-ink component of the display to render this information. Thus, Block S120 can visually display information that may be useful to a user in selecting adjacent or nearby vehicles that are available for rent. Block S120 can further control the brightness of light output by the visual indicator. For example, Block S120 can adjust the brightness of the visual output according to an ambient light level proximal the vehicle, according to a time of day, according to an amount of time that the vehicle is available (e.g., dims as availability period decreases), or according to seating availability in the vehicle (e.g., dims as additional seats are reserved). However, Block S120 can control the output of the visual indicator that includes a light source according to any other schema to signify driver's and/or passenger seat availability of the vehicle.

Figure 3:
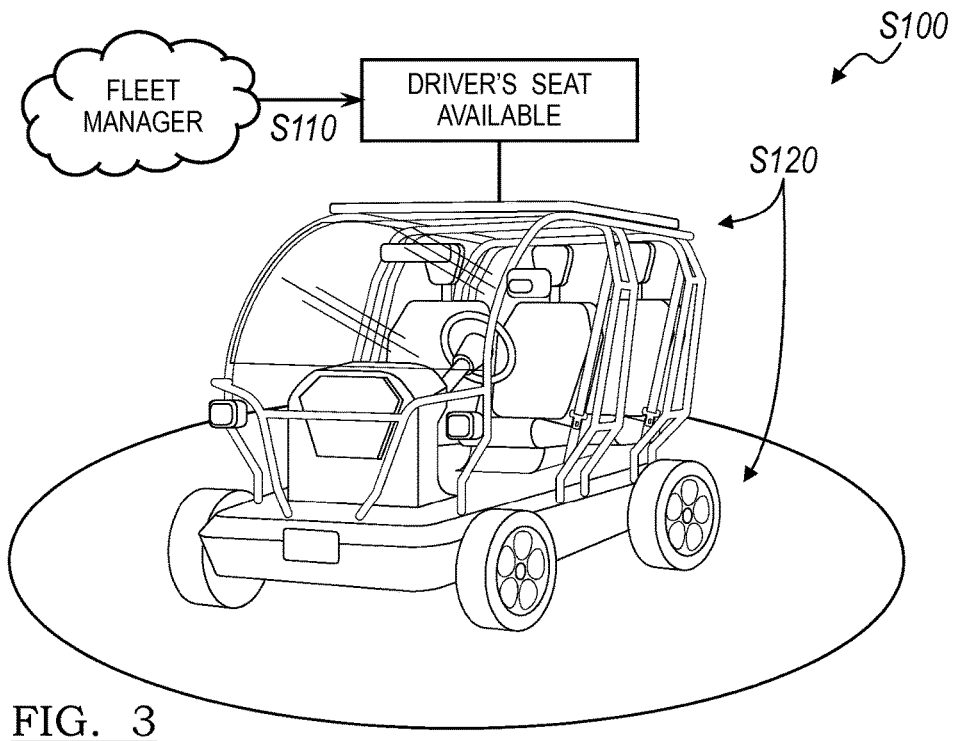
FIG. 3 is a perspective view of one implementation of the first method.
Figure 8:
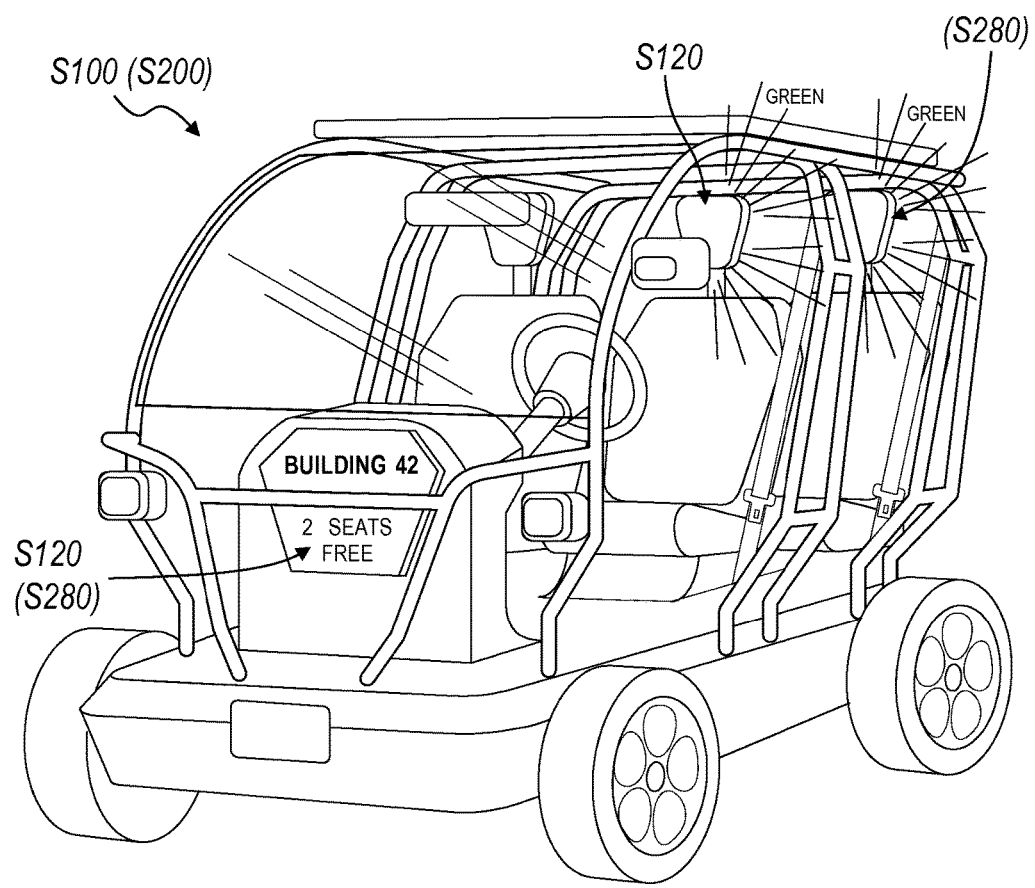
FIG. 8 is a perspective view of one implementation of the first and second methods.

In another implementation shown in FIG. 8, Block S120 indicates seating occupancy by controlling illumination of a portion of a seat (e.g., the driver's seat) of the rental vehicle, wherein the seat is illuminated in a first color to indicate occupancy and a second color to indicate vacancy. For example, a headrest of the seat can be substantially translucent can include a first light source that, when illuminated, causes the headrest to glow red to indicate that the seat has already been reserved for the trip, and a second light source that, when illuminated, causes the headrest to glow green to indicate that the seat is still available for the trip. Similarly, as shown in FIG. 3, Block S120 can control illumination of a ground surface proximal (e.g., around) the rental vehicle, wherein the ground surface is lit in a first color (e.g., red) to indicate full occupancy, a second color (e.g., yellow) to indicate passenger seat, and a third color (e.g. green) to indicate that the vehicle has not been reserved, has full vacancy, and/or has a vacant driver's seat. For example, the visual indicator can includes one or more LEDs, lamps (with colored gels), projectors, or other light sources arranged on the vehicle and directed toward the ground or underside of the vehicle. Alternatively, the rental vehicle can be parked on in a parking space or charging pad incorporating lighting effects, wherein Block S120 controls the lighting effects (e.g., wirelessly) to light an area on or adjacent the vehicle according to the availability status of the vehicle.

Figure 7:
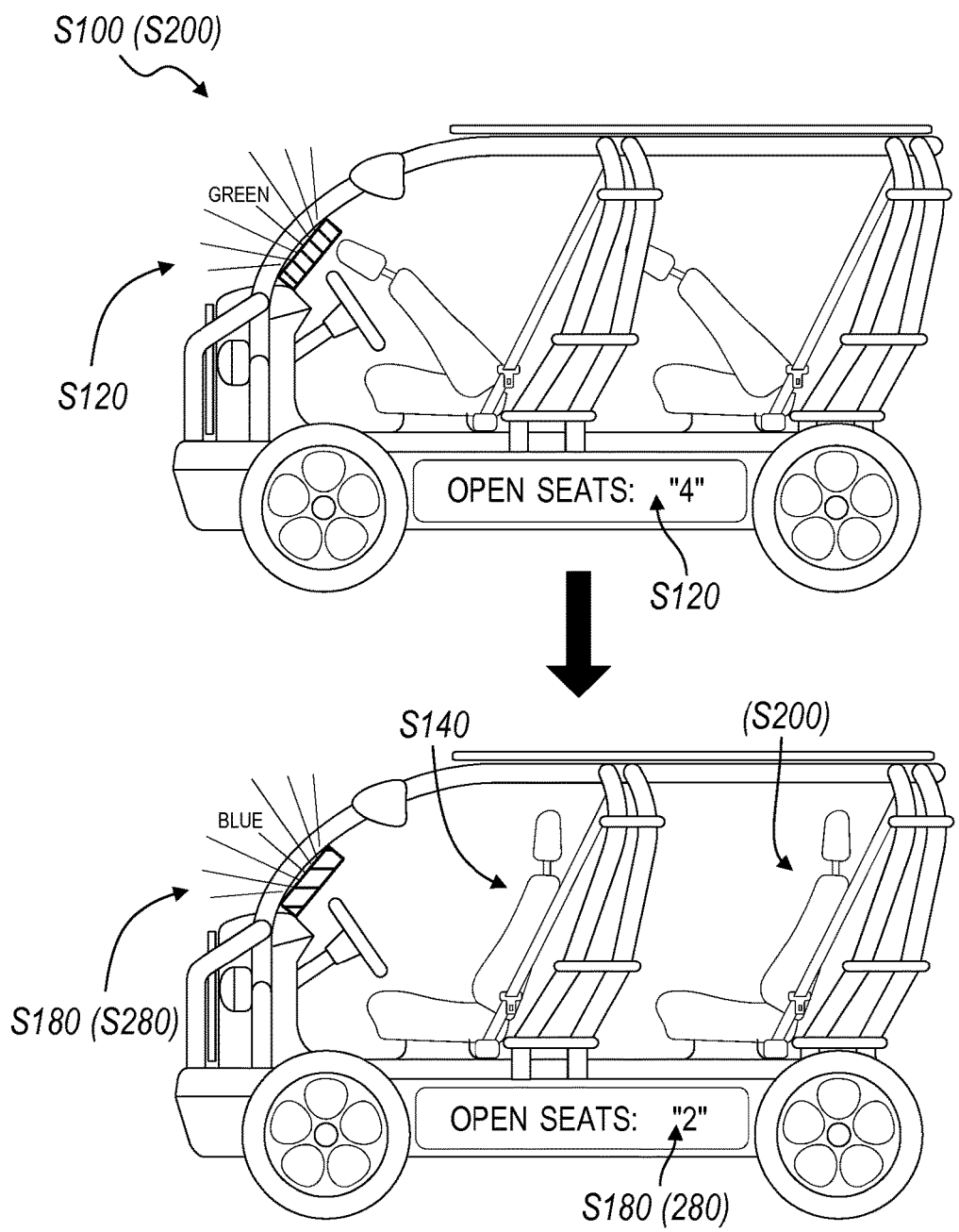
FIG. 7 is a flowchart representation of one implementation of the first and second methods.

In yet another implementation shown in FIG. 7, Block S120 controls a position of a seat (e.g., the driver's seat) in the vehicle, wherein Block S120 transitions the seat between a first position that indicates occupancy and a second position that indicates availability. For example, Block S120 can incline a the seatback of a seat held or reserved for another passenger forward to substantially cover the seat-bottom of the seat, thus preventing occupancy of the seat by other than the specified passenger. (In this example, the specified user can be required to provide positive identification, such as by swiping a credit card or scanning an identification card in order to access the seat). Similarly, Block S120 can maintain the seatback of an unreserved seat in an open or rearward position to indicate that the seat is still available, as shown in FIG. 7. Therefore, in this implementation, the visual indicator can be all or a portion of the seat itself.

In yet another implementation shown in FIGS. 7 and 8, the visual indicator includes a digital counter arranged on the vehicle, wherein Block S120 controls a number displayed on the digital counter to indicate driver and/or passenger seat availability. The digital counter can include a number of "dummy" lights, a digital display, a mechanical counter, or any other suitable counter. Block S120 can similarly control the visual indicator that depicts seat availability graphically, such as with a pie chart (e.g., on a lighted wheel) or a bar graph (e.g., across the top of the field windshield of the vehicle). For example, Block S120 can control a digital or heads-up display arranged on the rental vehicle (e.g., a LED, LCD, plasma, or segment display) or a projector that projects a graphical representation of seat availability onto a portion of the vehicle or onto the ground adjacent the vehicle.

In another implementation, Block S120 controls the visual indicator that includes one or more mechanical signs or indicators. For example the visual indicator can include a mechanical flag coupled to a mechanical actuator, wherein Block S120 controls the mechanical actuator to transition the flag from a first position (e.g., retracted) that signifies unavailability to a second position (e.g., extended) that signifies availability. In this example, the flag can also be illuminated and/or include text or a graphic describing availability of the vehicle.

Alternatively, Block S120 can implement an augmented reality overlay that applies the visual indicator over an image of the vehicle rendered on a display of a mobile computing device carried by a person proximal the vehicle, the image of the vehicle captured in real time by an optical sensor (e.g., camera) arranged within the mobile computing device. In this alternative, Block S120 can apply any one or more of the foregoing or following techniques in the augmented reality overlay in order to visually indicate the rental status of the vehicle in addition to or as an alternative to a physical visual indicator on or within the vehicle. However, Block S120 can control any type of visual indicator according to any schema to signify availability of the vehicle in any suitable way.

Block S120 can additionally or alternatively control communication of vehicle availability through non-visual communication channels. In one implementation, Block S120 controls a haptic indicator to signify availability of the vehicle. For example, Block S120 can control a vibrator arranged in the driver's seat of the vehicle, wherein the seat vibrate to indicate availability. In another implementation, Block S120 control advertisement of vehicle availability through a display, etc. arranged on a rental kiosk and/or on a charging station for the rental vehicle. Block S120 can also control an audio device to present vehicle availability in an audible format audibly. For example, Block S120 can communicate vehicle-related data over a loudspeaker or intercom system arranged on the vehicle, at a charging station, at a rental kiosk, or within a building in which potential users work or reside. In this example, such vehicle-related data can be communicated in any number of languages or through sirens or other audible cues. Block S120 can similarly interface with a horn integrated into the vehicle to alert a potential user proximal the vehicle of the vehicle's availability. In other implementation, Block S120 communicates vehicle-related data to mobile computing devices (e.g., smartphones, tablets) carried by potential users, such as within a threshold range of the vehicle. For example, Block S120 can transmit this information in the form of a text- and/or audio-based notification that can further direct a potential users to a website or native application in which to reserve a passenger or driver's seat in the vehicle. In any of the foregoing implementations or examples, Block S120 can interface with a camera or proximity sensor arranged on the vehicle or an adjacent kiosk or charging station to identify individuals near the vehicle, and Block S120 can initiate visual, audible, or other delivery of the status of the vehicle to the identified individuals. Additionally or alternatively, Block S120 can collect GPS or cellular signals from local mobile computing devices (e.g., smartphones) and push vehicle availability notifications to the mobile computing devices within a predetermined range of the vehicle (e.g., 500 feet). However, Block S120 can function in any other way to communicate vehicle availability in any suitable format to the user and/or other potential users outside of the vehicle.

Block S130 of method S100 recites receiving identification information of a user proximal the vehicle. Generally, Block S130 functions to capture information necessary to identify the user prior to enabling access to the vehicle, the driver's seat, and/or the vehicle's ignition for the user. Block S130 can collect any suitable type or quantity of information from the user, such as the user's name, birthday, driver's license number, credit or debit card number, checking account number, employee or employee badge number, email address, rental vehicle account username and/or password, online social networking profile, social security number, phone number, etc. Block S130 can also receive the identification information through any suitable data communication channel.

Figure 6:
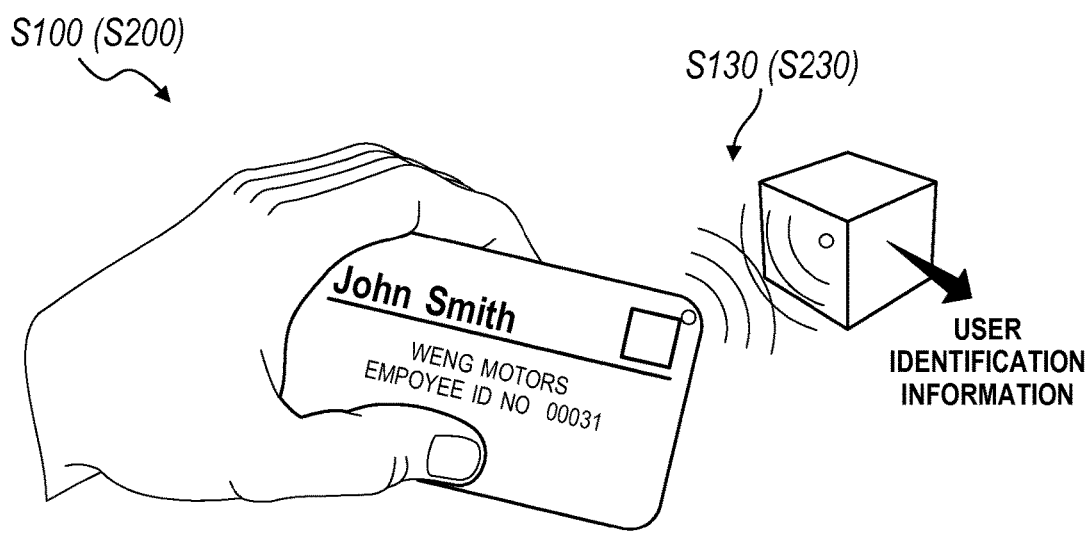
FIG. 6 is a schematic representation of one implementation of the first and second methods.

In one implementation, Block S130 interfaces with an RFID reader on or adjacent the vehicle, as shown in FIG. 6. The RFID reader can be configured to download information from an employee badge (shown in FIG. 6), a credit card, a driver's license, a mobile computing device e.g., smartphone), etc. issued to the user when within a suitable range of the RFID reader, and Block S130 can collect this downloaded information from the RFID reader. Block S130 can similarly interface with an NFC reader similarly configured to download information from a badge, card, etc. within a suitable range of the NFC reader, through Block S130 can interface with any other type of short-range reader to collect identification information of the user. In one example, the reader is arranged in the rental apparatus arranged within the vehicle, such as coupled to an interior surface of a window of the vehicle. In other examples, the reader is incorporated into an exterior door handle of the vehicle, a dashboard of the vehicle, or a kiosk or charging station proximal the vehicle, though Block S130 can interface with any other type of reader arranged on, within, or proximal the vehicle to collect any suitable user identification information in any other way.

In another implementation, Block S130 interfaces with an optical arranged within, on, or proximal the vehicle to collect relevant user information. In one example, Block S130 interfaces with a camera arranged within the rental apparatus to capture an image of a credit card, driver's license, passport, etc. held up to the camera by the user, wherein Block S130 implements a machine vision technique (e.g., optical character recognition (OCR)) to extract relevant information from the image. In this example, the camera can alternatively be incorporated into the vehicle, such as on an exterior door handle or on a dashboard within the vehicle, or on a kiosk or charging station proximal the vehicle. The camera can also be a incorporated into a mobile computing device carried by the user, wherein the mobile computing device captures the image transmits the image or extracted data from the image to at least one of a rental apparatus within the vehicle and a remote server (e.g., the vehicle fleet manager). In another example, the user implements a camera within a mobile computing device to capture an image of a portion of the vehicle, wherein a native rental application executing on the mobile computing device analyses the image (e.g., via OCR, object recognition, or other machine vision technique) to identify the vehicle in the image. The native application can then tag the identity of the vehicle with stored user information (e.g., a name, a phone number, or a rental account number or username stored by the native application) and transmit vehicle identity and tag(s) to at least one of the vehicle and a remote server. In this example, the image can be an image of a license plate, of a vehicle fleet number, of a barcode or quick-response (QR) code arranged on and unique to the vehicle, or of any other portion of the vehicle. However, Block S130 can interface with any other type of optical sensor arranged on, within, or proximal the vehicle to collect any suitable user identification information.

In another implementation, Block S130 collects user information stored on a mobile computing device carried by the user based on a location of the mobile computing device that is substantially proximal (e.g., within five feet of) the vehicle. For example, Block S130 can poll a GPS sensor within the mobile computing device and a GPS sensor within the vehicle, compare the locations of each, download user information from the mobile computing device when the distance between the mobile computing device and the vehicle is less than a threshold distance. However, Block S130 can also poll wireless routers or cellular towers in communication with the mobile computing device and/or the vehicle to determine a location of the mobile computing device and/or a location of the vehicle, though Block S130 can determine the location of the vehicle and the location of the mobile computing device in any other suitable way. Once Block S130 determines the mobile computing device to be suitably close to the vehicle, Block S130 can then pull user data from the mobile computing device (e.g., phone number, name, email address) to identify the user.

In yet another implementation, Block S130 can receive user identification information entered manually by the user, such as through a native rental application executing on mobile computing device. However, Block S130 can receive any type of user identification in any format and in any other way.

Block S130 can further implement the identification information of the user to verify the user as a suitable driver. For example, the Block S130 can identify the user based on the identification information and select a rental profile of the user according to the user's identity. In this example, Block S130 can access a driver's license, driving record, rental record, billing information, vehicle preferences (e.g., radio settings), etc. from the user's profile, and the user's profile can be stored in a database of rental profiles contained on a remote server. In one example implementation, Block S130 accesses a driver's license of the user, based on the identification information, to determine that the user is licensed to drive in the present state or country. In this example implementation, Block S130 can withhold access to the vehicle if the user lacks a valid driver's license. In another example implementation, Block S130 accesses stored billing information of the user, based on the identification information, to ensure that the user can pay for the vehicle rental and/or to bill the user for reserving the vehicle. In this example implementation, Block S130 can withhold access to the vehicle if the user lacks a valid billing account. In yet another example implementation, Block S130 accesses a driving record and rental record of the user, based on the identification information. In this example implementation, Block S130 can withhold access to the vehicle if the user has poor driving record, such as while driving the rental vehicle or other vehicle in the rental vehicle fleet. However, Block S130 can access and/or implement identification information of the user in any other way.

Block S140 of method S100 recites enabling access to the vehicle for the user in response to verification of the user as a driver of the vehicle. Generally, Block S140 controls access to the vehicle by the user based on whether or not the user is suitable as a driver of the vehicle. In one implementation in which the vehicle has lockable doors, Block S140 interfaces with a door lock controller within the vehicle to unlock the driver's door for the user. In this implementation, Block S140 can selectively unlock only the driver's door or a subset of doors including the driver's door, or Block S140 can unlock all doors of the vehicle. In this implementation, Block S140 can interface directly with the vehicle. For example, Block S140 can communicate an unlock command to the vehicle from through a mobile computing device carried by the user. In another example, Block S140 can communicate an unlock command from a server hosting the fleet manager to the vehicle via a long-range wireless radio incorporated into the vehicle. Alternatively, in this implementation, Block S140 can interface with an existing OEM vehicle-monitoring channel. For example, a third-party service supporting in-vehicle security and remote diagnostics systems through wireless communication with the vehicle can receive a door lock or unlock request from the vehicle fleet manager through Block S140, and the third-party service can transmit a lock or unlock command to the vehicle accordingly.

In another implementation in which the vehicle lacks doors (e.g., a low-speed electric vehicle), Block S140 can interface with an electromechanical seat mechanism to move the driver's seat into a position in which the driver's seat can be occupied by the user. For example, Block S140 can retract the driver's seat away from a dashboard to provide room for the user's feet in front of the seat or lift the seatback of the driver's seat such that the user can move his torso into the seat. Additionally or alternatively, Block S140 can interface with a lighting system within the car, such as to light the driver's seat to guide the user into the driver's seat at night.

Block S140 can further tailor access to the vehicle according to a specific seat assigned to or reserved by the user (i.e. the driver's seat) in order to guide the user into the correct seat. As described above, Block S140 can selectively unlock only the driver's door of the vehicle adjacent the driver's seat or selectively illuminate only the driver's seat to guide the user to the driver's seat at night.

In one implementation, Block S140 receives GPS location data from a mobile computing device associated with the user and compares the GPS location data of the user with a known location of the vehicle to determine that the user is within range of the vehicle. Block S140 then interfaces with an accelerometer, microphone, touch sensor, proximity sensor, and/or other sensor to determine that the user is adjacent the vehicle, and Block S140 can then unlock one or more doors of the vehicle. For example, Block S140 can interface with a microphone arranged in the vehicle to determine that the user has knocked on a window of the vehicle. In this example, Block S140 can correlate the location of the user and the knock on the vehicle's window with an entry request and thus unlock the vehicle accordingly. In this example, the knock can be any knock, a unique knock pattern selected by the user and associated with the user's rental account, or a knock pattern set by the vehicle fleet manager and communicated to the user, such as via the user's mobile computing device. In this example, the knock can thus function as a "key" to the vehicle, thus enabling Block S140 to authenticate the user without a tangible key or by collecting user information from a driver's license, credit card, etc. However, Block S140 can function in any other way to enable user access to the vehicle.

Block S150 of method S100 recites determining, through a sensor arranged within the vehicle, that the user is seated in a driver's seat within the vehicle. Generally, Block S150 functions to interface with one or more sensors within an interior space of the vehicle to determine that the user is seated in the driver's seat.

In one implementation, Block S150 polls an output of a seat occupancy sensor arranged within the driver's seat to determine that the driver's seat is occupied. For the vehicle that is only booked by the one entity—the user—Block S150 can determine that the user is occupying the driver's seat when the seat occupancy sensor in the driver's seat outputs an occupied signal. Additionally or alternatively, for the seat occupancy sensor that is a two-state sensor (i.e. a "seat occupied" state and a "seat not occupied" state), Block S150 can correlate a 'seat occupied' state with a user seating position within the vehicle based on a time that Block S140 enables access to the driver's seat for the user and when the seat occupancy sensor in the driver's seat changes to the 'seat occupied' state, such as in implementations in which multiple users book seats within the vehicle over time. The seat occupancy sensor in the driver's seat can have a substantially high threshold weight to trigger a state change, such as 70 lbs., thereby reducing risk that Block S150 will identify a child accidentally occupying the driver's seat as a suitable driver. For the seat sensor that measures the weight of an occupant, Block S140 can access a known weight of the user from the user's rental profile, and Block S150 can determine that the user is seated in the driver's seat given a seat occupancy sensor output within a threshold range of the known weight of the user (e.g., .+−.10%). However, Block S150 can interface with and analyze an output of a seat occupancy sensor in the driver's seat of the vehicle in any other way to determine that the user is occupying the driver's seat of the vehicle.

In another implementation, Block S150 interfaces with a location sensor in the vehicle and a location sensor in a mobile computing device (e.g., smartphone) carried (or worn) by the user to determine that the user is seated in a driver's seat of the vehicle. For example, Block S150 can collect GPS location data from a GPS sensor integrated into the vehicle as well as GPS location data from a GPS sensor integrated into the mobile computing device, compare the location data of the vehicle and the mobile computing device, and thus pinpoint the location of the user as in the driver's seat of the vehicle, such as based on an assumption that the user is holding the mobile computing device in a hand or pocket. In this example, Block S150 can triangulate the user's location to improve accuracy of the determined user's location by further interfacing with a second GPS sensor integrated into the vehicle (e.g., at an opposite end of the vehicle) or another GPS sensor arranged proximal the vehicle (e.g., in a vehicle charging station). However, Block S150 can interface with and analyze an output of one or more location sensors integrated into the vehicle and/or into the mobile computing device in any other way to determine that the user is occupying the driver's seat of the vehicle.

In yet another implementation, Block S150 interfaces with one or more motion sensors integrated into a mobile computing device (e.g., smartphone) carried by the user to determine that the user is seated in a driver's seat of the vehicle. In the implementation of Block S130 that includes a card, magnetic stripe, RFID, NFC, optical sensor, or other reader that requires the user to stand or sit in to a known location in order to capture relevant user information, Block S150 can set the information collection location as an initial location, collect data from an gyroscope and/or accelerometer arranged in the mobile computing device, and track the user's motion toward and into the driver's seat based on the collected data, such as by implementing dead reckoning. In this implementation, Block S150 can again assume that the user is carrying, wearing, or holding the mobile computing device as he walks toward and enters the vehicle. However, Block S150 can interface with and analyze an output of one or more motion sensors integrated into the mobile computing device in any other way to determine that the user is occupying the driver's seat of the vehicle.

In a further implementation, Block S150 interfaces with one or more optical sensors integrated into the vehicle. For example, the optical sensor can be arranged on a dashboard or rearview mirror assembly within the vehicle and cab be directed rearward, wherein Block S150 retrieves and analyzes an image of the cabin of the vehicle to identify vehicle occupants. In this example, Block S130 can retrieve an image of the user (e.g., from a social networking profile of the user), and Block S150 can implement a facial recognition technique to identify the user once seating in the vehicle. Once the user is identified in the image, Block S150 can correlate a location of the user identified within the image with a seating position of the user within the vehicle. In this example, Block S150 can implement a similar technique to additionally or alternatively identify a passenger and his seating position within the vehicle. However, Block S150 can interface with and analyze an output of one or more optical sensors integrated into the vehicle in any other way to identify and determine a seating position of the user within the vehicle.

In another implementation, Block S150 can implement an RFID or NFC reader in the driver's seat to poll a nearest mobile computing device, identify the nearest mobile computing device as belonging to the user, and determine that the user is occupying the driver's seat. In a further implementation, Block S130 can interface with a sensor or other system integrated into a driver's door of the vehicle to collect user information from the user while the user stands proximal the driver's door, and Block S150 can determine that the user occupies the driver's seat based on a sequence of an opened driver's door, a state change in a seat occupancy sensor in the driver's seat, and a closed driver's door following retrieval of user identification information. However, Block S150 can interface with any other sensor or system integrated into or arranged on the vehicle and/or a mobile computing device carried, worn, or held by the user to determine a seating position of the user within the vehicle.

Block S160 of method S100 recites enabling ignition of the vehicle for the user in response to determination that the user is seated in the driver's seat. Generally, Block S160 functions to withhold use of the vehicle until an occupant condition is met. In various examples, Block S160 can withhold use of the vehicle until Block S150 determines that the user is seated in the driver's seat, until a number of occupants in the vehicle meets or exceeds a threshold occupancy level (e.g., one driver and at least one passenger), until all occupants are wearing a seatbelt, until no occupant under 80 lbs. is seated in a front seat of the vehicle, and/or until any other condition is met. The condition(s) can be static and predefined, such as a condition governed by law. For example, the static condition can be that the driver must be identified as having a valid driver's license or that no child may sit in a front seat of the vehicle. Alternatively, the condition can be dynamic, such as based on a time of day or a vehicle or mobility demand. For example, the dynamic condition can specify a first minimum threshold vehicle occupancy of one (i.e. just a driver) during low demand hours (e.g., 9 pm-6 am), a second minimum threshold vehicle occupancy of three (i.e., a driver and two passengers) during high demand hours (e.g., 7 am-9 am and 4 pm-6 pm), and a third minimum threshold vehicle occupancy of two (i.e. a driver and one passenger) during medium demand hours (e.g., 10 am-2 pm and 7 pm-9 pm). In the foregoing examples, Block S110 can retrieve one or more static or dynamic conditions from a fleet manager and pass the one or more conditions to Block S160 to control use to the vehicle. Block S160 can also withhold the vehicle for user for a specified period of time, such as thirty seconds or two minutes, after Block S130 collects the user's identification information or after Block S150 determines that the user is seated in the driver's seat. In this implementation, the withhold time can also be static or dynamic, such as based on current anticipated future vehicle or mobility demand. However, Block S160 can set or receive any condition on use of the vehicle in any other suitable way.

In one implementation, Block S160 withholds use of the vehicle by blocking function of an ignition component of the vehicle. In one example in which the vehicle is a gasoline-, natural gas-, liquid petroleum-, hydrogen-, or other fuel-powered vehicle, Block S160 can block ignition of the vehicle by cutting power to a fuel pump, a starter motor, an ignition condenser, a distributor, a magneto, an electric fuel injection system, etc. In another example in which the vehicle is an electric vehicle or other type of vehicle that does not burn a fuel for power, Block S160 can block ignition of the vehicle by opening a circuit between a battery and a motor, by cutting power to an inverter, etc. In this implementation, once Block S150 determines that the user is seated in the driver's seat of the vehicle and/or any other occupant condition is met, Block S160 can enable function of the ignition component, thereby enabling the user to turn the vehicle "ON" via any suitable interface, such as a "start" button, a rotary ignition switch, or a "start vehicle" button within a native vehicle rental application executing on a mobile computing device.

Figure 5:
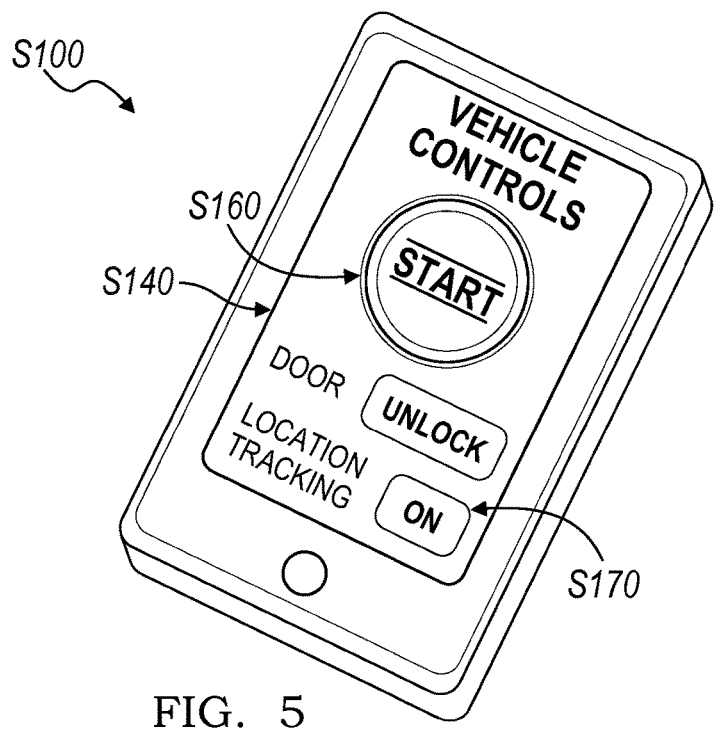
FIG. 5 is a schematic representation of one implementation of the first method.

In another implementation, Block S160 can control an ignition interface through which a user turns the vehicle "ON." In one example in which the vehicle includes a start button, Block S160 can disable the start button until the occupancy condition is met. In this example, Block S160 can enable the ignition function once the occupancy condition is met, thereby enabling the user to start the vehicle by contacting or engaging the start button within the vehicle. In another example in which the vehicle includes a rotary ignition switch (e.g., for a key), Block S160 can lock the position of the rotary ignition switch until the occupancy condition is met. In this example, Block S160 can enable the ignition function once the occupancy condition is met, thereby enabling the user to start the vehicle by rotating the ignition switch (or key within the ignition key). In a further example in which the ignition system of the vehicle can be controlled through a native application executing on a mobile computing device carried by the user (e.g., the rental vehicle application), Block S160 can block a "start vehicle" interface or lock a "start vehicle" function within the native application until the occupancy condition is met. In this example, Block S160 can enable the ignition function once the occupancy condition is met, thereby enabling the user to start the vehicle by supplying an input to the mobile computing device, such as by selecting a portion of a touchscreen on which a "start vehicle" button is displayed, as shown in FIG. 5. However, Block S160 can block and then enable ignition of the vehicle in any other way, according to any other occupancy condition, and/or according to any other user input.

In yet another implementation, Block S160 automatically turns the vehicle "ON" once one or more occupancy conditions are met. In an example in which the vehicle is a gasoline, diesel, or other fossil fuel vehicle, Block S160 can start the vehicle's engine once Block S150 determines that the use is seated in the driver's seat. In another example in which the vehicle is an electric of electric hybrid vehicle, Block S160 can switch "ON" the propulsion system of the vehicle once a vehicle occupancy threshold is reached. In this or the foregoing implementations, Block S160 can also control a visual or audible indicator that informs the use that the vehicle's ignition has been enabled and/or that the vehicle is "ON." However, Block S160 can function in any other way to control use of the vehicle based on occupancy conditions of the vehicle.

As shown in FIG. 5, one variation of method S100 further includes Block S170, which recites tracking a location of the vehicle while occupied by the user. Generally, Block S170 functions to log the location of the vehicle while in use, thereby enabling method S100 to estimate or determine how long the user will occupy or use the vehicle, the fuel or battery range of the vehicle, where, when, and how the vehicle is most useful (e.g., during lunch periods, on weekends), how the vehicle is used (e.g., to go to lunch, to commute to work), how the user drivers (e.g., aggressively, safely), etc. In one implementation, Block S170 interfaces with a sensor or communication module arranged in or integrated into the vehicle. In various examples, Block S170 can interface with a GPS sensor to obtain a GPS coordinate of the vehicle, triangulate the vehicle based on local cellular towers, or retrieve a location tag from a local Wi-Fi router. In another implementation, Block S170 can interface with a sensor or communication module arranged on or integrated into a mobile computing device carried by the user. In this implementation, Block S170 can implement similar techniques to determine the location of the mobile computing device, which can be correlated with the location of the user and therefore the vehicle.

As shown in FIG. 1, one variation of method S100 further includes Block S180, which recites updating the visual indicator to specify unavailability of the vehicle in response to verification of the user as a driver of the vehicle. Generally, Block S180 functions to update the visual indicator to show that the user has booked (i.e. reserved) the vehicle, such as once Block S130 collects identification information from and/or verifies the user, once Block S150 determines that the user is seated in the driver's seat, or once Block S160 determines that one or more occupancy conditions has been met. Block S180 can therefore implement similar functions or techniques as those implemented by Block S120 described above. For example, once Block S150 detects that the user is seated in the driver's seat, Block S180 can transition the visual indicator from displaying a blue hue indicating vehicle availability to an orange hue indicating limited passenger availability. In another example, once Block S160 enables the ignition system of the vehicle and/or once the vehicle is in motion, Block S180 can transition the visual indicator from displaying an orange hue indicating limited passenger availability to displaying a white hue indicating the vehicle is in use.

Block S180 can additionally or alternatively disperse an electronic notification to potential riders proximal the vehicle. For example, Block S180 can generate and disperse an electronic notification to a selection of cellular phones (e.g., smartphones) or computers within a 500 feet radius of the vehicle. In this example, the electronic notification can be an in-app notification, email, SMS text message, calendar alert, or other type of electronic communication transmitted directly from the vehicle (e.g., over the Internet via a Wi-Fi connection) or routed through an external communication channel (e.g., from the fleet manager on a remote server to a cellular tower). The notification can include any one or more of the remaining occupancy of the vehicle (e.g., four seats left), a scheduled time of departure of the vehicle, an identify of the driver (i.e. the user), an identifier of the vehicle (e.g., vehicle fleet number, license plate number), a location of the vehicle (e.g., parking lot, parking lot number), a destination of the vehicle (e.g., entered by the user into a vehicle rental application on his smartphone, extracted from a calendar event of the user, predicted based on the user's habits), etc. In this example, Block S180 can selectively transmit the electronic notification, such as to friends or coworkers of the user, to persons who frequent the same shops or restaurants of the user, to persons who live along or near a scheduled route of the vehicle, to persons who have calendar events occurring along or near a schedules route of the vehicle, etc. Alternatively, Block S180 can display or render any of this information directly on or adjacent the vehicle, such as on a digital or heads-up display arranged on the vehicle, on a kiosk adjacent the vehicle, or on a charging station adjacent the vehicle. However, Block S180 can inform one or more persons outside the vehicle of the availability or unavailability of the vehicle or seats within the vehicle in any other way.

2. Method for Controlling Occupancy of a Vehicle

Figure 2:
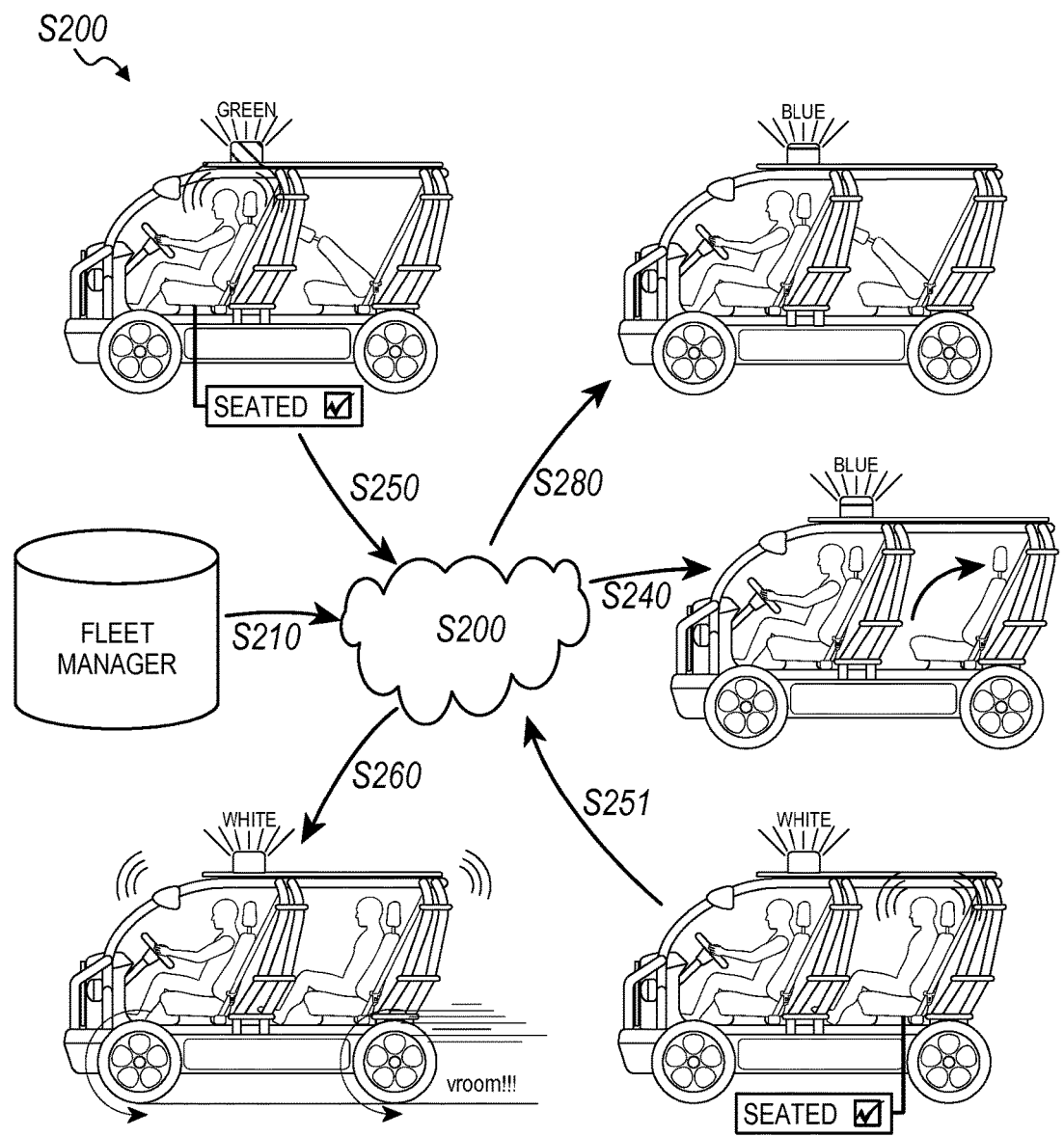
FIG. 2 is a flowchart representation of a method of a second embodiment of the invention.

As shown in FIG. 2, method S200 for controlling occupancy of a vehicle includes: determining, through a sensor arranged within the vehicle, that a driver is seated in a driver's seat within the vehicle in Block S250; updating a visual indicator according to passenger availability of the vehicle in Block S280, the visual indicator arranged on the vehicle and visually detectable from outside the vehicle; for a user proximal the vehicle, enabling access to a passenger seat within the vehicle in response to verification of the user as a passenger of the vehicle in Block S240; determining, through a sensor arranged within the vehicle, that the user is seated in a passenger seat within the vehicle in Block S251; and enabling ignition of the vehicle in response to a number of occupants within the vehicle meeting a threshold minimum number of occupants in Block S260.

Similar to method S100 described above, method S200 functions to display an availability status of a rental vehicle such that a user outside the vehicle can visually discern a passenger seat availability of the vehicle's, to capture an identity of the user, and to assign the user to a passenger seat within the vehicle. Generally, method S200 can be implemented following method S100 described above to attract one or more additional passengers to the vehicle once a suitable driver has been reserved and/or entered the vehicle. Method S200 can therefore be applicable to a vehicle in a fleet of rental vehicles, in a fleet of shared private vehicles, that a single shared private vehicle, etc. to enable substantially real-time or "impulse" carpooling or booking of a passenger seat within the vehicle. By visually displaying an availability status of the vehicle, method S200 can enable a user who is outside of the vehicle, such as walking through a parking lot or in an adjacent building, to substantially immediately ascertain the availability of the vehicle, and by collecting identification information of the user, method S200 can determine substantially in real-time if the user is a suitable passenger and/or how to bill the user for the rental. Furthermore, by determining the user's seating position and controlling access to the vehicle (e.g., door entry, ignition), method S200 can control who enters and who drives the vehicle.

Similar to method S100 described above, method S200 can be implemented by a vehicle rental apparatus, such as arranged on, arranged within, or incorporated into the vehicle. The rental apparatus can include a processor and input and output modules that interface with various vehicle systems, such as a door locking function, an ignition function within the vehicle, and a seat occupancy sensor. The rental apparatus can also implement an optical sensor (e.g., camera), a radio-frequency identification (RFID) reader, a barcode scanner, a magnetic stripe reader, a near-field communication (NFC) reader, or any other sensor or combination of sensors to capture an identify of the user. The rental apparatus can further include a wireless communication module that communicates with a remote computer system that implements a vehicle fleet manager to set availability of one or more vehicles in a fleet of rental vehicles, such as based on current or anticipated future demand. For example, the vehicle fleet manager can handle user- and vehicle-related data collected by and transmitted from the rental apparatus to identify a location of the vehicle and to verify the user as a suitable driver. The vehicle fleet manager can be implemented by a computer system that is a cloud-based computer system (e.g., Amazon EC2), a mainframe computer system, a grid-computer system, or any other suitable computer system. The rental apparatus can additionally or alternatively interface with a mobile computing device carried by and/or issued to the user (e.g., a smartphone, a tablet), such as via a Wi-Fi, Bluetooth, cellular, or other wireless connection. For example, the rental apparatus can interface with a native application executing on the mobile computing device to access user identification information, to confirm a vehicle booking, to unlock the vehicle, and/or to start the vehicle based on one or more user inputs into the mobile computing device and wirelessly communicated to the rental apparatus. All or a portion of method S200 can be implemented directly by a native application executing on a mobile computing device (e.g., a smartphone, a tablet), such as variations that implement Block S280 through an augmented reality overlay on a display of the mobile computing device, as described below. However, similar to Blocks of method S100 described above, one or more Blocks of method S200 can be implemented by any one or more of a rental apparatus within the system, a remote computer system and/or vehicle fleet manager, a mobile computing device (e.g., carried by and/or issued to the user), a local kiosk proximal the vehicle, or any other suitable device, system, controller, etc.

Block S250 of method S200 recites determining, through a sensor arranged within the vehicle, that a driver is seated in a driver's seat within the vehicle. Generally, Block S250 can implement techniques or functionality similar to that of Block S150 described above to determine that a driver is seated in a driver's seat within the vehicle. Block S250 can additionally or alternatively implement one or more techniques or functions described above to determine that a suitable driver has booked or reserved the vehicle, is waiting outside the vehicle for an additional passenger, etc. However, Block S250 can function in any other suitable way to identify a driver of the vehicle.

Figure 4:
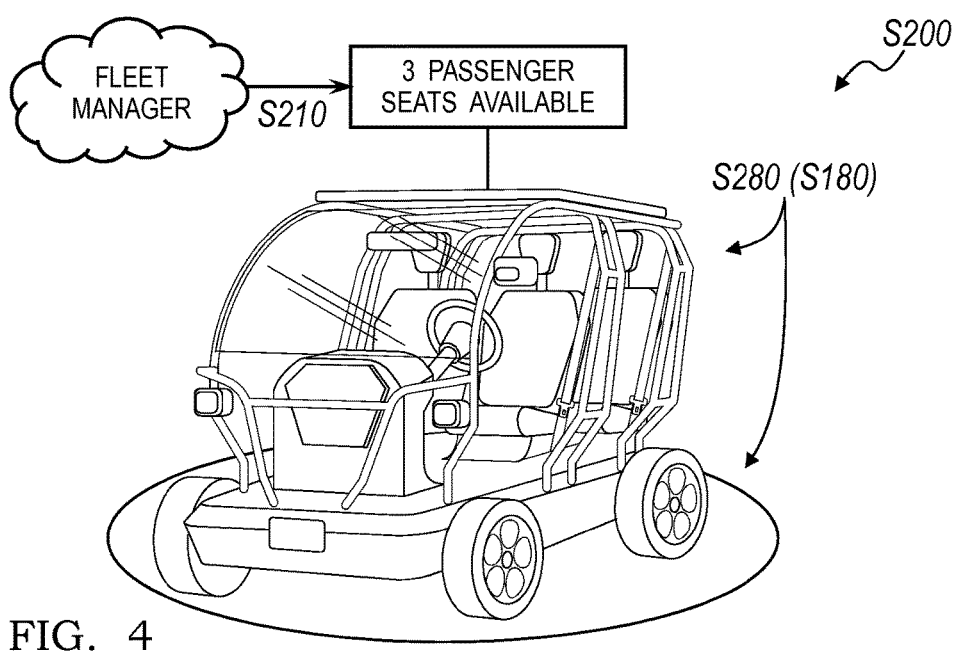
FIG. 4 is a perspective view of one implementation of the first and second methods.

As shown in FIG. 4, Block S280 of method S200 recites updating a visual indicator according to passenger availability of the vehicle, the visual indicator arranged on the vehicle and visually detectable from outside the vehicle. Generally, Block S280 can implement techniques or functionality similar to that of Block S120 and/or Block S180 described above to notify the user and/or other persons outside of the vehicle of passenger seat availability in the vehicle. For example, Block S280 can update the visual indicator when rental status of the vehicle changes from being fully available to having available passenger seats once a driver books or enters the vehicle. As described above Block S280 can interface with a visual indicator that includes a light source, a display, or a projector arranged on or near the vehicle and illuminating a surface on or near the vehicle. For example, the visual indicator can include a light source, and Block S280 can change a lighting color of the light source from a first color signifying availability of a driving position within vehicle to a second color signifying availability of a passenger position within the vehicle when a driver enters the vehicle. In this example, the visual indicator can highlight a portion of an available passenger seat to indicate its availability, such as by illuminating a headrest of the passenger seat with a first color (e.g., green) when available. Block S280 can also highlight the headrest of the passenger seat a second color (e.g., red) when unavailable.

As also described above, Block S280 can additionally or alternatively generate and distribute an electronic notification of passenger seat availability, vehicle route, vehicle departure time, vehicle location, or any other vehicle-related information, such as in the form of an in-app pop-up notification, a SMS text message, or a calendar alert.

Block S280 can further advertise a destination of the vehicle and control advertisement of this information to the user, such as on a digital or heads-up display arranged on the vehicle as shown in FIG. 8. Block S280 can similarly advertise a vehicle departure time, such as in the form of a countdown timer or clock. However, Block S280 can function in any other way to inform the user and/or other person outside the vehicle that a passenger seat is available in the vehicle.

One variation of method S200 includes Block S230, which recites receiving identification information of the user, accessing a rental account of the user based on the identification information, and verifying the user as a suitable passenger of the vehicle. Generally, Block S230 can interface with similar or the same hardware component(s) and implement similar techniques or methods as Block S130 above to collect information from the user and to identify the user. Like Block S130, Block S230 can also verify that the user is a suitable passenger in the vehicle. For example, Block S230 can capture or receive an image of a credit card issued to the user, such as through an optical sensor arranged on the vehicle, and determine that user is a suitable passenger by interfacing with a point-of-sale system to verify a name and account specified on the credit card. Therefore, Block S230 can also collect billing information of the user, such as described above in method S100. In another example, Block S230 accesses a social networking profile of the user to determine if the user is an adult or child and, if the user is determined to be a child, specify a rear seat of the vehicle and/or a booster seat for the user. In yet another example, Block S230 can access a black list for the driver, the black list specifying passengers with whom the driver is not legally permitted to occupy a vehicle or with whom the driver does not prefer to share a vehicle (e.g., an ex-wife, a convicted criminal). If the black list indicates that the user is not a suitable passenger in the vehicle driven by the driver, Block S230 can trigger a flag to refuse user entry to the vehicle or to prevent use of the vehicle until the user disembarks from the vehicle. Block S230 can similarly access and implement data stored in a passenger black list, a vehicle- or fleet-specific black list, or a white list indicating a limited or preferred set of acceptable vehicle, driver, and/or passenger combinations. In this example, Block S230 ca access a black (or white) list populated by users, by the fleet manager, by a law enforcement agency, a company or other entity that sponsors vehicle rentals, etc. However, Block S230 can function in any other way to identify the user and/or verify the user as a passenger of the vehicle.

Block S240 of method S200 recites, for a user proximal the vehicle, enabling access to a passenger seat within the vehicle in response to verification of the user as a passenger of the vehicle. Generally, Block S240 can interface with similar hardware components and/or implement similar techniques or functionality as Block S140 described above to enable the user to access a specified seat within the vehicle. For example, Block S240 can selectively unlock a door of the vehicle that is adjacent a passenger seat assigned to the user. However, Block S240 can function in any other way to enable the user to access the passenger seat of the vehicle.

Block S251 of method S200 recites determining, through a sensor arranged within the vehicle, that the user is seated in a passenger seat within the vehicle. Generally, Block S251 can interface with similar hardware components and/or implement similar techniques or functionality as Block S150 described above to determine a seating position of the user within the vehicle. For example, Block S251 can poll a seat occupancy sensor arranged within the passenger seat assigned to the user to determine that the user has entered the seat. Block S250 can similarly poll a seat occupancy sensor arranged within the driver's seat to determine that a driver has entered the vehicle. In another example, Block S251 can cooperate with Block S250 to analyze an image of an interior space of the vehicle and identify the user and the driver, respectively, such as by implementing facial recognition. In this example, a camera arranged on a dashboard or on a rearview mirror assembly within the vehicle can capture the image. However, Block S251 can function in any other way to determine that the user is seated in the vehicle.

Block S260 of method S200 recites enabling ignition of the vehicle in response to a number of occupants within the vehicle meeting a threshold minimum number of occupants. Generally, Block S260 can interface with similar hardware components and/or implement similar techniques or functionality as Block S160 described above to enable use of the vehicle based on a static or dynamic occupancy condition. For example, Block S260 can retrieve a minimum occupancy threshold from the fleet manager (e.g., wirelessly over a cellular connection) and implement the minimum occupancy threshold by withholding ignition of the vehicle until the sum of the driver, the user, and/or other passengers in the vehicle meets or exceeds the minimum occupancy threshold. As described above, Block S260 can also enable ignition of the vehicle based on expiration of a timer, such as thirty seconds or two minutes after the driver or the user enters the vehicle or books a seat in the vehicle. Furthermore, like Block S160, Block S260 can remotely start the vehicle once one or more occupancy to time conditions are met. For example, the fleet manager, executing on a remote server, can communicate a "start vehicle" signal to the vehicle over a wireless communication channel (e.g., a cellular network) to remotely start the vehicle. However, Block S260 can function in any other way to withhold and subsequently enable use of the vehicle.

As shown in FIGS. 2 and 4, one variation of method S100 further includes Block S210, which recites receiving a signal from a fleet manager, the signal specifying the threshold minimum number of occupants. Generally, Block S210 can interface with similar hardware components and/or implement similar techniques or functionality as Block S110 described above to retrieve various data from a fleet manager, such as a fleet manager implemented on a remote server. For example, Block S210 can retrieve the signal that specifies the minimum threshold number of occupants, such as according to an estimated future mobility demand proximal the vehicle. However, Block S210 can retrieve any other data from the fleet manager and in any other way, such as via any other suitable communication channel.

3. Apparatus for Renting a Vehicle

Figure 9:
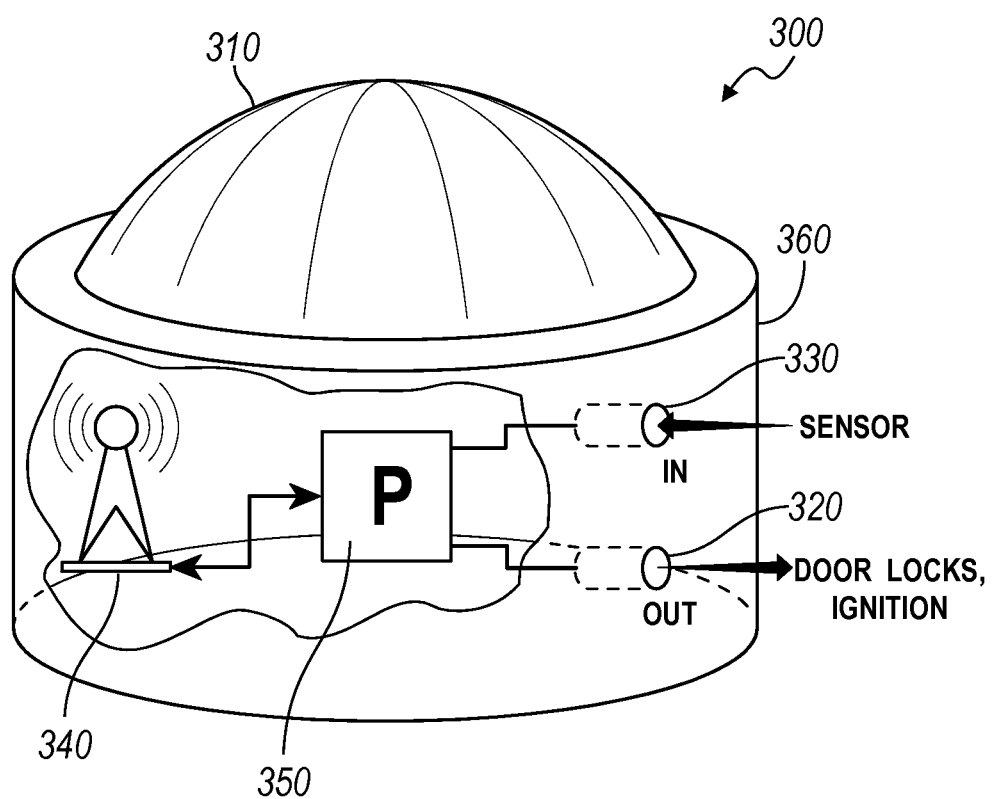
FIG. 9 is a perspective cutaway view of an apparatus of a third embodiment of the invention.

As shown in FIG. 9, an apparatus 300 for renting a vehicle includes: a visual indicator 310 configured for arrangement on a vehicle to indicate availability of the vehicle for rent; an output module 320 electrically coupled to a door locking function and an ignition function of the vehicle; an input module 330 configured to receive a signal from a sensor arranged within the vehicle; a wireless communication module 340 configured to communicate with a remote vehicle fleet manager; and a processor 350 configured to receive a rental availability of the vehicle from the vehicle fleet manager via the wireless communication module 340, to control the visual indicator 310 according to the rental availability of the vehicle, to control the door locking function via the output module 320 to provide access to the vehicle for a user, to identify a seating position of the user within the vehicle according to a signal received from the sensor via the input module 330, and to control the ignition function of the vehicle via the output module 320 based on the seating position of the user.

Generally, the apparatus 300 functions to implement method S100 and/or method S200 described above to rent a vehicle to a first user (i.e., a driver) and to increase occupancy of the vehicle by attracting a second user to the vehicle (i.e., a passenger). The apparatus 300 therefore includes hardware and processing components to handle communicating with a fleet manager, communicating a vehicle and vehicle occupancy status, capturing user information, controlling access to the vehicle, detecting seat occupancy, and enabling use of the vehicle.

The visual indicator 310 of the apparatus is configured for arrangement on the vehicle to indicate availability of the vehicle for rent. As described above, a light source configured to project light out of the window of the vehicle, onto the dash of the vehicle, onto a hood of the vehicle, onto a headboard of the vehicle, and/or onto any other surface of or adjacent the vehicle. The visual indicator 310 can be controlled by the processor 350 based on availability of the vehicle for rent and/or vehicle occupancy. The processor 350 can therefore implement techniques described above to control the visual indicator 310. The processor 350 can additionally or alternatively generate and disperse an electronic notification to one or more persons outside the vehicle to inform the one or more persons of the availability and/or occupancy of the vehicle. However, the visual indicator 310 can be any other type of indicator and controlled in any other way by the processor 350, fleet manager, etc.

The output module 320 of the apparatus 300 is electrically coupled to a door locking function and an ignition function of the vehicle. Generally, the output module 320 communicates control signals from the processor 350 via a wired or wireless connection to various components within the vehicle, including a door locking function and an ignition system integrated into the vehicle. For example, the output module 320 can include implement Bluetooth or other short-range wireless communication protocol to transmit a door lock signal and/or an ignition signal to a main computer within the vehicle to control the door locking and ignition systems of the vehicle, respectively. Alternatively, the output module 320 can transmit a door lock signal and/or an ignition signal directly to a door lock controller within the vehicle or to the ignition system, respectively, within the vehicle directly or to a central computer or sub controller within the vehicle through a wired connection. The output module 320 can also interface with any other component of the vehicle, such as a lighting system, an alarm system, a stereo system, an in-dash or heads-up display, etc., any of which can be controlled by the processor 350, fleet manager (i.e. remotely), etc.

Figure 11:
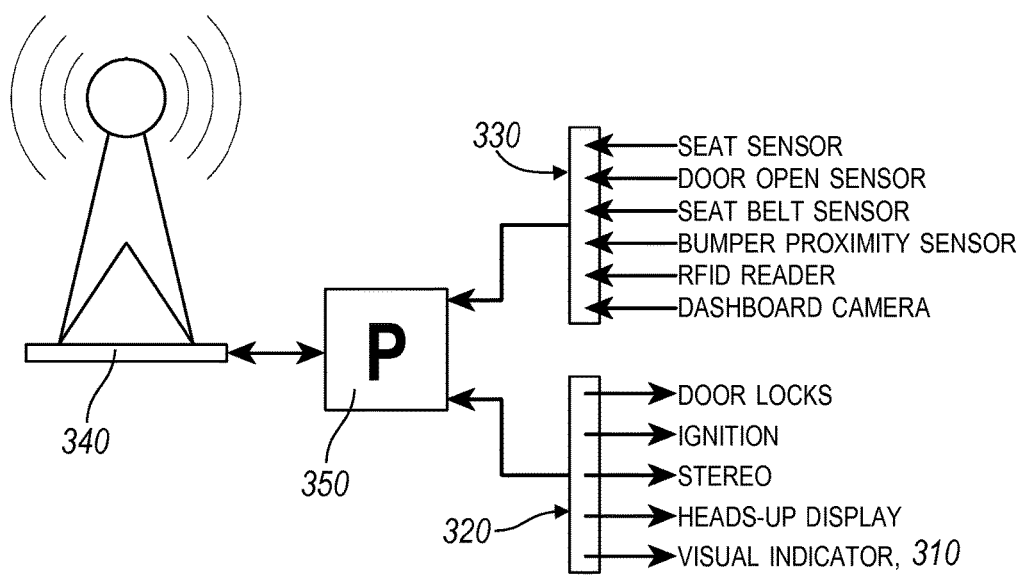
FIG. 11 is a schematic representation of an implementation of the apparatus.

The input module 330 of the apparatus 300 is configured to receive a signal from a sensor arranged within the vehicle. Generally, the input module 330 functions to collect user-, occupancy-, and/or vehicle-related and to pass these data to the processor 350 where the data is manipulated to determine vehicle occupancy, control vehicle access, control vehicle use, etc. The input module 330 can also be coupled to the communication module, which can transmit any of these data to the fleet manager to control vehicle rental parameters, set occupant conditions, etc. Therefore, the input module 330 can interface with a card, NFC, RFID, or other reader, a seat occupancy sensor arranged in a seat within the vehicle, a proximity sensor within a bumper of the vehicle, a camera arranged inside the cabin of the vehicle or on an exterior surface of the vehicle, a seatbelt sensor, a door (open or closed) sensor, a speedometer or tachometer, an accelerometer, a gyroscope, a GPS sensor, or any other sensor within the vehicle, as shown in FIG. 11. The input module 330 can collect data from any one or more sensors via a wired or wireless connection (e.g., Bluetooth connection) to a particular sensor, a sub controller connected to a particular sensor, a main computer within the vehicle, etc. However, the input module 330 can communicate data from any one or more sensors to the processor 350 and/or to the fleet manager in any other suitable way.

The wireless communication module 340 of the apparatus 300 is configured to communicate with the remote vehicle fleet manager. Generally, the wireless communication module 340 implements a Wi-Fi, cellular, satellite, or other medium- to long-range communication protocol to transmit data to and from a remote server incorporating the vehicle fleet manager. For example, the wireless communication module 340 can transmit user-, occupancy-, and vehicle-related data to the fleet manager and receive occupant conditions, driver and passenger verification, vehicle booking schedules, etc. from the fleet manager. The wireless communication module 340 can also communicate with a mobile computing device carried by a user to collect data stored on the device and/or to push a notification, door locking control, ignition control, etc. to the user. Furthermore, the wireless communication module 340 can implement a short-to-medium-range communication protocol (e.g., Bluetooth, XBee) to communicate with the fleet manager through the mobile computing device. The wireless communication module 340 can further embody or include an RFID, NFC, or other contactless reader to capture information from the user. However, the wireless communication module 340 can transmit data to or through and/or receive data from any suitable server, device, network, etc.

The processor 350 of the apparatus 300 is configured to receive a rental availability of the vehicle from the vehicle fleet manager via the wireless communication module 340, to control the visual indicator 310 according to the rental availability of the vehicle, to control the door locking function via the output module 320 to provide access to the vehicle for a user, to identify a seating position of the user within the vehicle according to a signal received from the sensor via the input module 330, and to control the ignition function of the vehicle via the output module 320 based on the seating position of the user. Generally, the processor 350 functions to implement one or more Blocks of method S100 and/or S200. The processor 350 can be a standalone microcontroller, a central processing unit (CPU) integrated into the vehicle, an electronic control unit (ECU) integrated into the vehicle, a sublevel microcontroller or other processor integrated into the vehicle, or any other suitable type of controller or processor arranged in the vehicle in any other suitable way.

In one implementation, the apparatus 300 defines a standalone, discreet system that is installed on or within a vehicle, as shown in FIG. 9. In this implementation, the apparatus 300 can therefore include a housing 360 configured to couple to a surface of or to be installed in a portion of the vehicle and to contain the visual indicator 310, the output module 320, the input module 330, the wireless communication module 340, and the processor 350. In one example, the apparatus 300 can include a round plastic housing configured to couple to an interior surface of a windshield of the vehicle, such as via a suction cup or adhesive, wherein the visual indicator 310 is arranged on the housing 360 to direct light out of the windshield when the apparatus 300 is installed in the interior surface of the windshield. In other examples, the apparatus 300 can be configured to couple to a dashboard of the vehicle via a hook-and-loop fastener (e.g., Velcro), or installed on a roof or window pillar of the vehicle, such as with a threaded fastener. The apparatus 300 can also be self-powered, such as by a battery or a solar panel arranged in or on the apparatus 300. Additionally or alternatively, the apparatus 300 can siphon power from the vehicle. For example, the apparatus 300 can include a plug that engages a cigarette lighter jack or a USB jack within the cabin of the vehicle. In another example, the apparatus 300 can include a plug configured to engage an on-board diagnostic (OBD) receptacle in the vehicle, which can enable the apparatus 300 to receive power and data from the vehicle. Alternatively, the apparatus 300 can be hardwired to the vehicle's electrical system.

In the foregoing implementation, the apparatus 300 can be removable from the vehicle, such as to move the apparatus 300 between vehicles in order to offer a different selection of vehicles for rent. For example, the apparatus 300 can be a cylindrical housing that mounts to a window or a dashboard within the vehicle, or the apparatus 300 can be a replacement rearview mirror assembly, such as a rearview mirror assembly that replaces an OEM or stock rearview mirror assembly within the vehicle.

Figure 10:
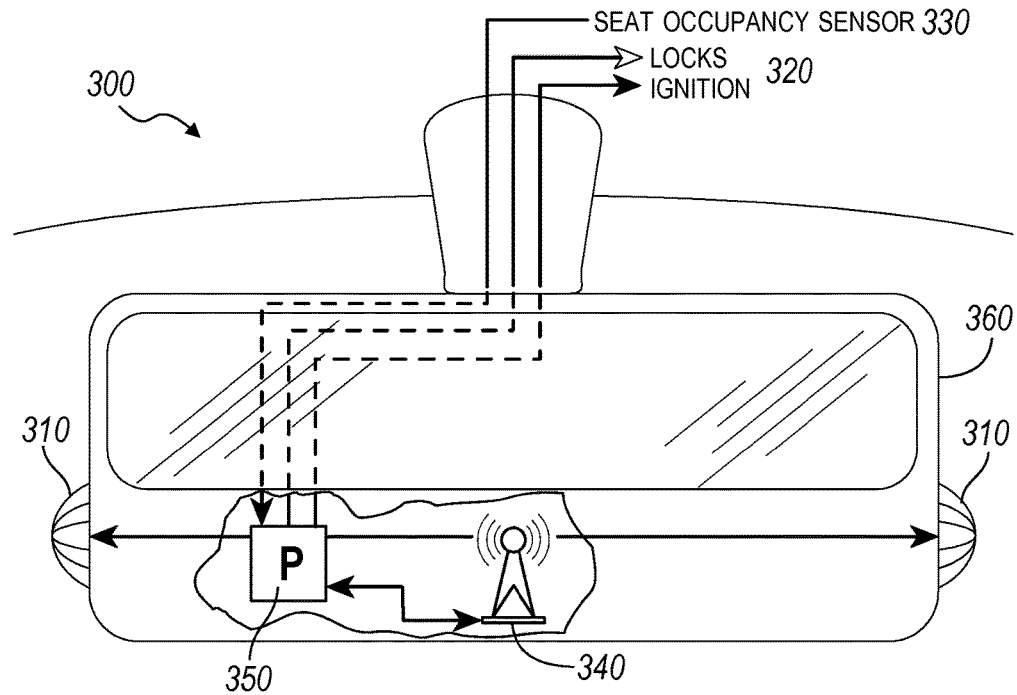
FIG. 10 is an elevation cutaway view of an implementation of the apparatus.

As shown in FIG. 10, in another implementation, the apparatus 300 defines an integrated vehicle system. Specifically, it this implementation, the processor 350 can integrated in the vehicle in the form of a CPU, ECU, sublevel microcontroller, etc., such as during the vehicle's manufacture, wherein the processor 350 interfaces and/or controls various systems within the vehicle directly, such as a door lock function, an ignition function, an in-dash display, a GPS sensor, etc. In this implementation, the visual indicator 310 can be integrated into a rearview mirror assembly (shown in FIG. 10), headlight, taillight, backup light, running board light, or any other system or component within the vehicle.

In yet another implementation, the apparatus 300 includes the processor 350 and wireless communication device that are integrated into a mobile computing device carried by the user (e.g., a smartphone), wherein the output module 320 and input module are integrated or arranged within the vehicle. In this implementation, the visual indicator 310 can be a standalone component arranged on or within the vehicle, a kiosk proximal the vehicle, or a charging booth adjacent the vehicle. Alternatively, the visual indicator 310 can be integrated into the vehicle, such as into a rearview mirror assembly, headlight, taillight, backup light, running board light, or any other system or component within the vehicle. In this implementation, the apparatus 300 can further include a second wireless communication module that communicates with the wireless communication module 340 integrated into the mobile computing device, such as to communicate vehicle occupancy data to the device and to receive ignition and door lock control signals from the device. However, the apparatus 300 can be of any other form implemented in any other way and can include any other suitable components.

The apparatus 300 and methods 100, 200 of the invention can be embodied and/or implemented at least in part as a machine configured to receive a computer-readable medium storing computer-readable instructions. The instructions can be executed by computer-executable components integrated with the vehicle, scheduling kiosk(s), a remote scheduling server, hardware/firmware/software elements of a user computer or mobile device, or any suitable combination thereof. Other systems and methods of the invention can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for indicating whether a vehicle is available for use by a user and permitting use of the vehicle by the user, the method comprising the steps of:
providing, by a visual indicator visible to a user outside of the vehicle, a visual indication that the vehicle is available for use;
receiving, by a processor of a computing device in the vehicle, identification information of a first user proximal the vehicle;
verifying the first user as a driver of the vehicle;
providing, by the processor, access to the vehicle for the first user;
after providing access to the vehicle, changing the visual indication so the visual indication is that the vehicle is available for passenger use;
receiving, by the processor of the computing device in the vehicle, identification information of a second user proximal the vehicle;
providing, by the processor, access to the vehicle for the second user;
determining that the first user is seated in a driver's seat within the vehicle; and
enabling ignition of the vehicle upon determining that the first user is seated in the driver's seat.

2. The method of claim 1, wherein the visual indicator comprises a light source.

3. The method of claim 2, wherein the step of providing a visual indication that the vehicle is available for use comprises emitting a first color of light from the light source.

4. The method of claim 3, wherein the step of changing the visual indicator so the visual indication is that the vehicle is available for passenger use comprises emitting a second color of light from the light source.

5. The method of claim 2, wherein the light source is disposed on a rearview mirror assembly in the vehicle.

6. The method of claim 2, wherein the light source comprises a multi-color LED.

7. The method of claim 1, wherein the step of receiving identification information of the first user comprises receiving identification information of the first user through an RFID reader.

8. The method of claim 1, wherein the step of receiving identification information of the first user comprises receiving identification information of the first user through wireless communications with a mobile computing device of the first user.

9. The method of claim 1, wherein the step of providing access to the vehicle comprises unlocking a door of the vehicle.

10. The method of claim 1, wherein the step of determining that the first user is seated in the driver's seat comprises polling an output of a seat occupancy sensor.

11. The method of claim 1, wherein the step of determining that the first user is seated in the driver's seat comprises correlating GPS position data of a mobile computing device of the first user with a GPS position of the vehicle.

12. The method of claim 1, wherein the step of enabling ignition of the vehicle comprises enabling the first user to start the vehicle through an application executing on a mobile computing device of the first user.

13. An apparatus incorporated in a vehicle to ascertaining whether the vehicle for use, comprising:
  a visual indicator disposed on or in the vehicle such that the visual indicator is visible to a user outside the vehicle;
  a processor and a memory storing instructions, that when executed by the processor, cause the processor to:
    provide, by the visual indicator, a visual indication that the vehicle is available for use;
    receive identification information of a first user proximal the vehicle;
    verify the first user as a driver of the vehicle;
    provide access to the vehicle for the first user by unlocking a door of the vehicle,
    after providing access to the vehicle for the first user, change the visual indication such that the visual indication is that the vehicle is available for passenger use;
    receive identification information of a second user proximal the vehicle;
    provide access to the vehicle for the second user;
    determine that the first user is seated in a driver's seat within the vehicle; and
    enable ignition of the vehicle upon determining that the first user is seated in the driver's seat.

14. The apparatus of claim 13, wherein the visual indicator comprises a light source.

15. The apparatus of claim 14, wherein the light source is arranged on a rearview mirror assembly within the vehicle, or on an interior surface of a window of the vehicle.

\* \* \* \* \*